Sept. 6, 1960 J. LOUARN 2,951,380
DEVICE FOR REVERSING THE BLADES OF A TURBINE
Filed June 16, 1958 4 Sheets-Sheet 1

INVENTOR
JEAN LOUARN
BY Cameron, Kerkam & Sutton
ATTORNEYS

Sept. 6, 1960 J. LOUARN 2,951,380
DEVICE FOR REVERSING THE BLADES OF A TURBINE
Filed June 16, 1958 4 Sheets-Sheet 2
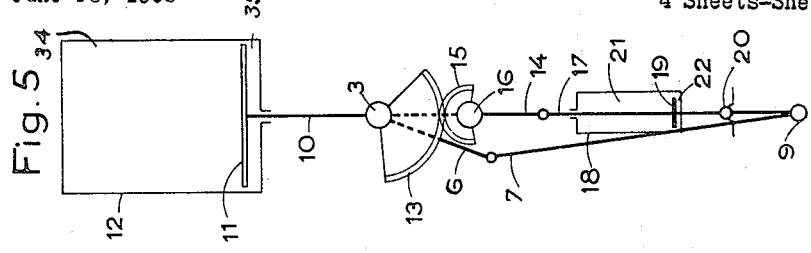
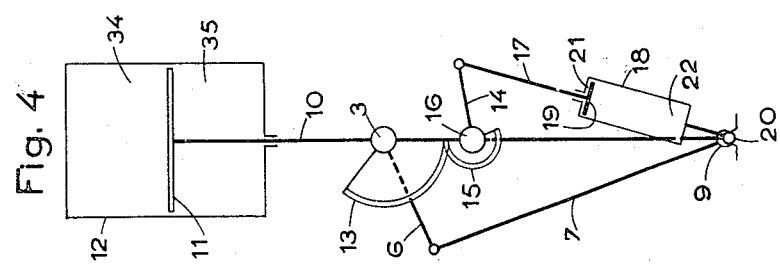
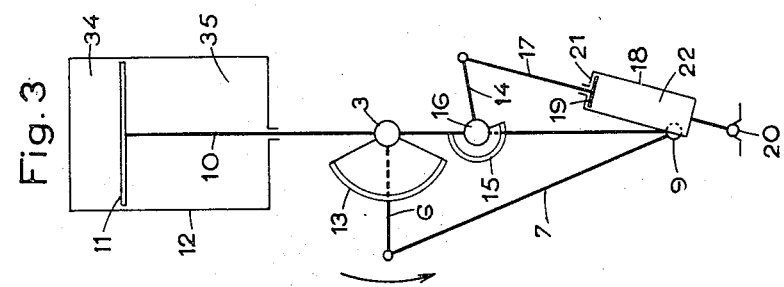
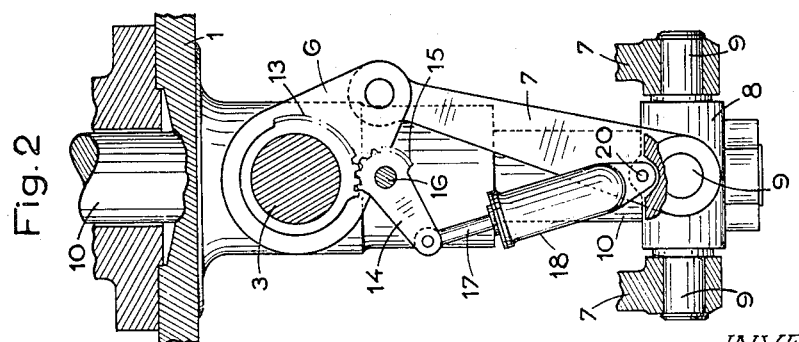
INVENTOR
JEAN LOUARN
BY Cameron, Kerkam & Sutton
ATTORNEYS

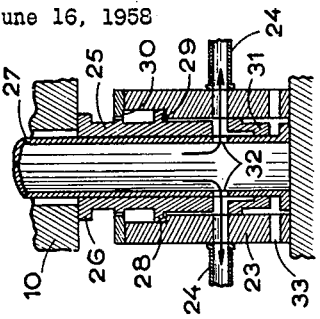
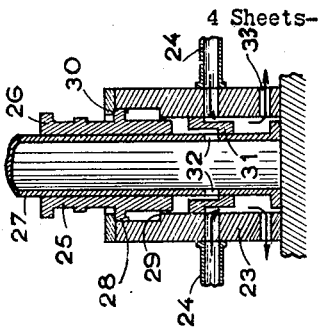
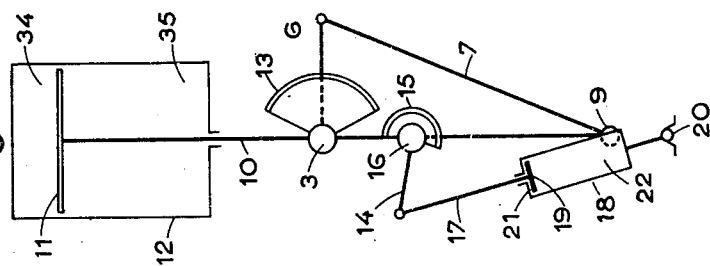
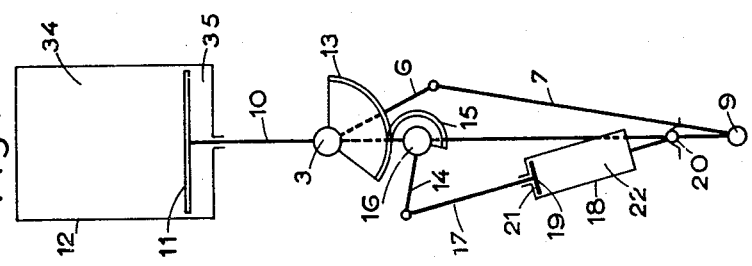
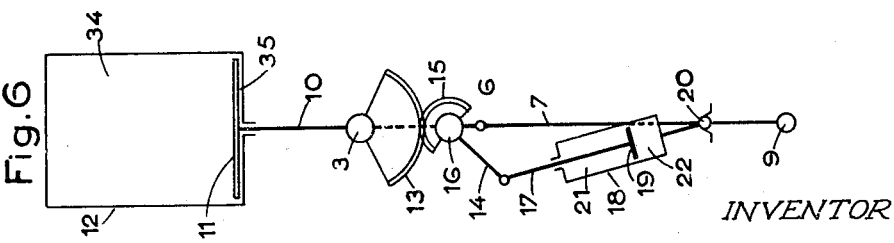

Sept. 6, 1960   J. LOUARN   2,951,380
DEVICE FOR REVERSING THE BLADES OF A TURBINE
Filed June 16, 1958   4 Sheets-Sheet 4
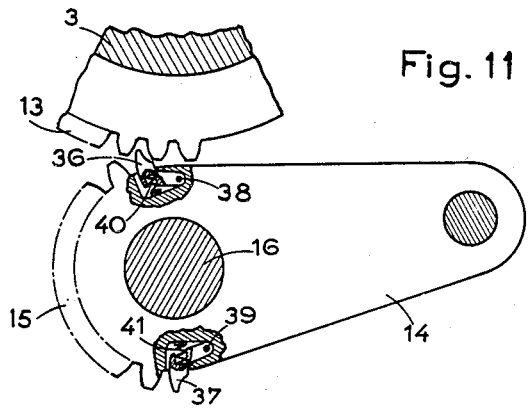
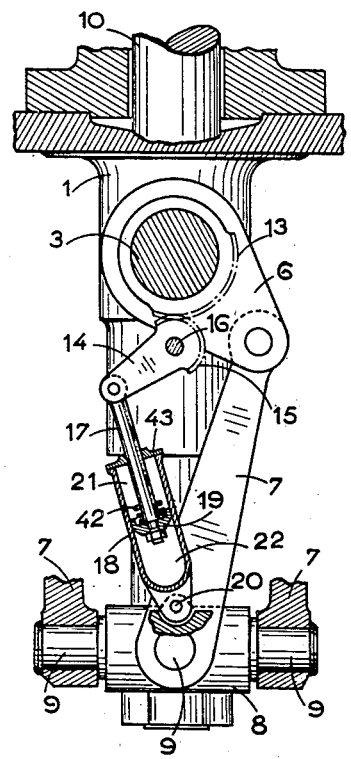
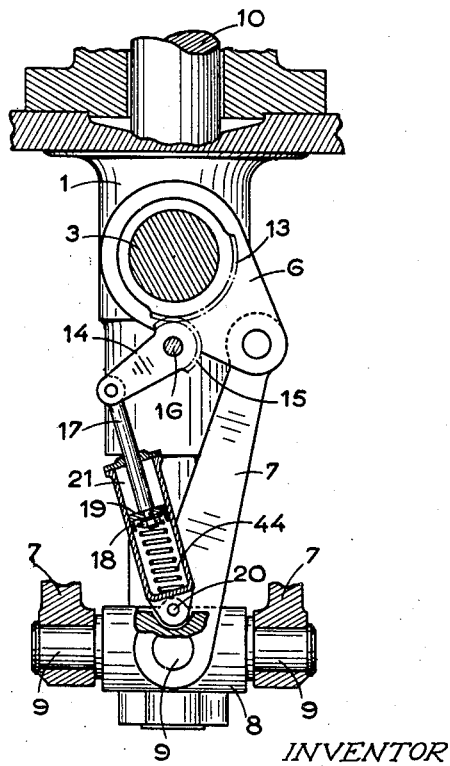
INVENTOR
JEAN LOUARN
BY Cameron, Kerkam & Sutton
ATTORNEYS

United States Patent Office 2,951,380
Patented Sept. 6, 1960

2,951,380

DEVICE FOR REVERSING THE BLADES OF A TURBINE

Jean Louarn, Le Creusot, France, assignor to Société des Forges et Ateliers du Creusot, Paris, France, a French company Filed June 16, 1958, Ser. No. 742,292

Claims priority, application France June 18, 1957

5 Claims. (Cl. 74—36)

The invention relates to a device for reversing the blades of a turbine, in particular for a tide-driven turbine.

Hydraulic machines installed in tide-driven power stations are required to operate not only as turbines, but also as pumps, this being so whatever the direction of water flow.

In order to obtain both high efficiency, and satisfactory behaviour as regards cavitation, in the various types of operation, it has been proposed to use Kaplan turbines in which the blades may be completely reversed, so as always to present the most favourable leading edge to the flow of water.

The required angle of rotation of the blades is then greater than 180°, for example on the order of 220°, which corresponds to reversal of the blades, and rotation of the blades from 0° to 220° is the zone of adjustment of the blades.

The mechanisms for controlling the blades customarily used in the hubs of Kaplan turbines do not allow such rotation to be obtained. In fact, the angle of rotation is generally limited to a value of less than 180° because of the dead centres of the control mechanisms.

The present invention concerns an auxiliary control mechanism which is used only for the purpose of passing the dead centre of the main control mechanism, and is not used during adjustment operations in normal running.

The blades may be reversed automatically, and the auxiliary control mechanism, which is of very small size, may occupy the free space found in the hubs of Kaplan turbines.

The mechanism of the invention is reliable in operation and is very strong because of its simplicity.

The present invention therefore relates to a device for reversing the blades of a turbine, in particular a tide-driven turbine, comprising a servo motor having a reciprocating piston connected to the journal of each blade through a main connecting-rod and crank system which may pass through a dead centre position at which position the piston of the servo motor must change the direction in which it is moving, and to an auxiliary control mechanism which assists the main connecting-rod and crank system to pass its dead centre position.

In this device the auxiliary control mechanism comprises a first toothed sector secured to the journal of one blade; a second toothed sector having a smaller development and radius than those of the first toothed sector having its axis parallel to that of the journal and capable of meshing with the first toothed sector; an auxiliary connecting-rod and crank system in which the crank is secured to the second toothed sector, this auxiliary connecting-rod and crank system passing through a dead centre; and a return device coupled to the connecting-rod of the auxiliary connecting-rod and crank system to cause the crank to continue rotating after the dead centre of the auxiliary connecting-rod and crank system has been passed.

The invention will now be described in greater detail, with reference being made to embodiments thereof shown by way of example and illustrated in the accompanying drawings.

In the drawings

Fig. 2 is a view partly in section along the line II—II in Fig. 1.

Figure 1:
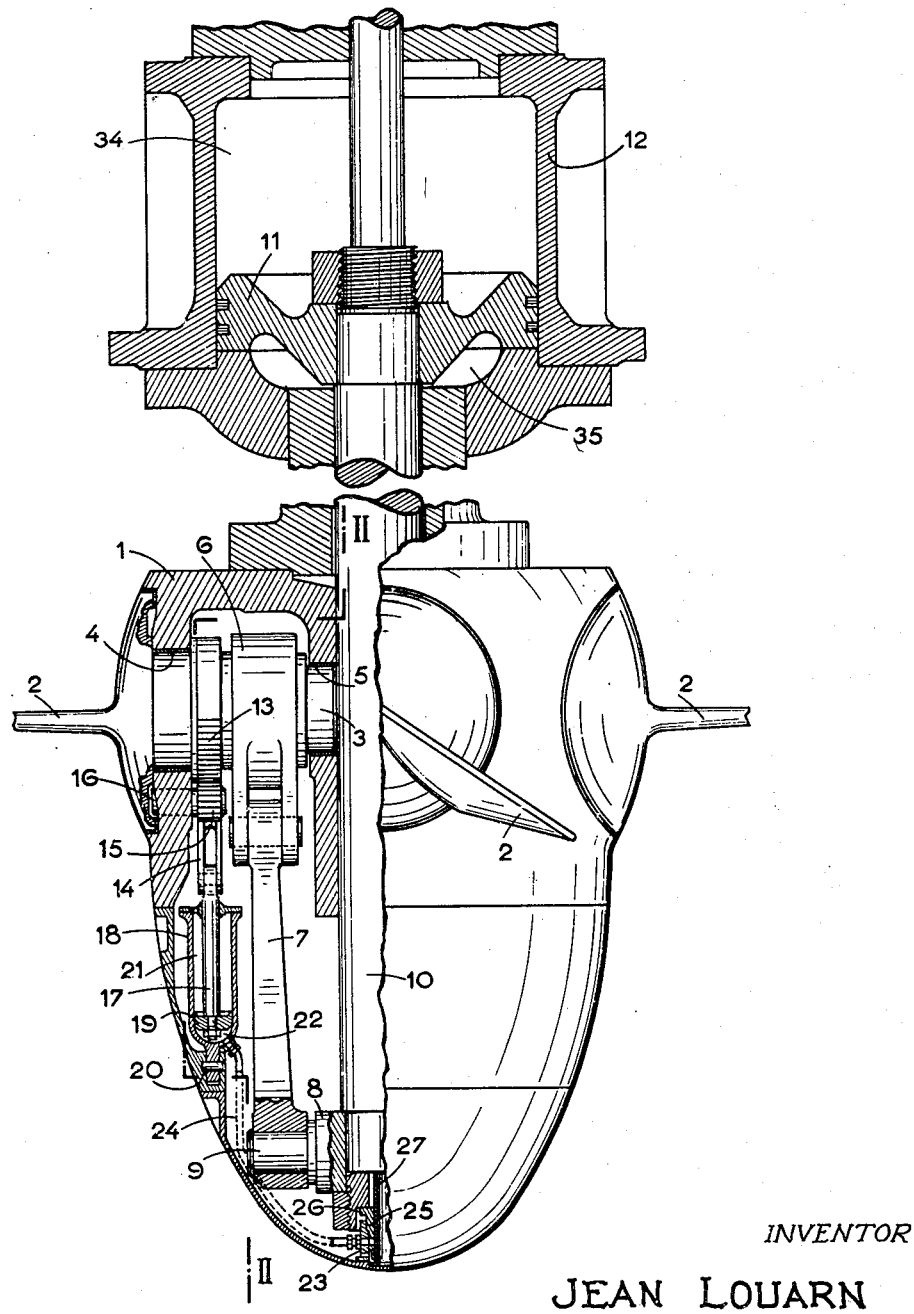
Fig. 1 illustrates an elevation of the hub of a Kaplan turbine partly in section comprising a blade-reversing device according to the invention.

Figs. 3 to 8 diagrammatically illustrate the operation of the reversing device.

Figs. 9 and 10 illustrate in vertical section, on a larger scale than in Fig. 1, the hydraulic distributor controlling the auxiliary mechanism in two different positions.

Fig. 11 illustrates the toothed sectors on a large scale.

Figs. 12 and 13 are views partly in section, similar to Fig. 2, showing two variants of the embodiment of Fig. 2.

The embodiment illustrated in Figs. 1 to 11 comprises the preferred adjustment mechanism which will now be described.

On the body of the hub 1 of the turbine are mounted the blades 2, which may be four in number as shown in the figure. Each blade 2 includes a journal 3 supported by two bearings 4 and 5.

A lever 6 is keyed to each journal 3, between the bearings 4 and 5.

A connecting-rod 7 is articulated to the end of the lever 6, and at its other end to cross-head 8. The rotational axis 9 of the connecting-rod 7 on the cross-head 8 is disposed in the plane defined by the axis of the hub 1 and the rotational axis of the blade 2 being considered. Axis 9 is parallel to the axis of the journal 3.

The cross-head 8 is connected by a rod 10 to the piston 11 of a servo control motor 12 which may be either incorporated in the hub 1 or disposed outside it, along the shaft of the turbine.

The orientation of the blades 2 is controlled by the position of piston 11 through the rod 10, the cross-head 8 and the system comprising the connecting-rod 7 and the crank 6.

This connecting-rod and crank system has a dead centre, and the present invention deals with an auxiliary control system which allows this dead centre to be passed, and this auxiliary control system will now be described.

It comprises a toothed sector 13 secured to each journal 3. This toothed sector is situated on the same side as the crank 6, and is symmetrical with respect to the axial plane of the crank.

A crank 14 is secured to a toothed sector 15 situated on the opposite side of the arm of the crank 14, and is symmetrical with respect to the axial plane of the latter. Crank 14 rotates on a pin 16 mounted on hub 1.

The toothed sectors 13 and 15 mesh when their relative positions permit, but are free from one another during normal orienting of the blades.

A connecting-rod 17 is articulated to the end of the crank 14, and is coupled to an auxiliary servo motor 18.

In the embodiment illustrated in Figs. 1 to 11, the connecting-rod 17 constitutes the rod of the piston 19 of the servo motor 18. This servo motor pivots on a pin 20 mounted on hub 1. Pin 20 is situated in the plane defined by the axis of the hub 1 and the axis of the journal 3 of the blade being considered.

Servo motor 18 is single-acting. Piston 19 divides the cylinder of the servo motor into two chambers 21 and 22.

The chamber 21 is in direct communication with the interior of the hub 1 from which the liquid is drained or in which the liquid is at low pressure.

The chamber 22 is in communication with a distributor 23 through a duct 24.

A distribution slide-valve 25 slides in the distributor 23.

The distributor and its slide-valve are situated at the base of and on the axis of the hub 1. The slide-valve 25 is controlled by the lower end of the rod 10 of the main servo motor 12 which bears against a shoulder 26 formed at the top of the distribution slide-valve.

Figures 9 and 10 illustrate the distribution slide-valve in two different positions.

Liquid under pressure reaches the slide-valve 25 via the pipe 27 situated inside the rod 10 of the servo motor 12.

Figure 9 illustrates the distribution slide-valve in a position in which it sets up communication between the pipe 27 and the pipe 24 admitting liquid to the chamber 22 of the jack 18. In this position, the rod 10 of the servo motor 12 has driven the distribution slide-valve downwards by acting on the shoulder 26.

Figure 10 illustrates the distribution slide-valve 25 in its lifted position when rod 10 of servo motor 12, having moved up, no longer bears against the shoulder 26.

In this case, the distribution slide-valve has moved in the same direction as the rod 10 under the action of the liquid under pressure, which acts at all times on the lower face of a collar 28 carried by the slide-valve.

The two extreme positions of the slide-valve 25 of the distributor are determined by the collar 28 which abuts against the shoulder 30 formed in the distributor, and by the extreme bottom position of the rod 10 which controls the said slide-valve.

In the position of the slide-valve of the distributor illustrated in Fig. 10, communication is cut off between the liquid inlet pipe 27 and the pipe 24 feeding the servo motor 18. Communication is established between the said pipe 24 and the interior of the hub 1, through orifices 33 in the lower portion of the distributor because partition 31 in the slide-valve 25 blocks the exhaust orifice 32 of the pipe 27.

The toothed sector 13 is controlled by the main servo motor 12, while the toothed sector 15 is controlled by the auxiliary servo motor 18.

As has already been indicated, the toothed sectors 13 and 15 are so arranged as not to be in mesh during normal adjusting of the blades.

The pitch diameter of the sector 15 is smaller than that of the sector 13, so that the auxiliary control mechanism comprising the connecting-rod and crank system 14—17 passes dead centre before the normal blade-adjustment mechanism comprising the connecting-rod and crank system 6—7 passes its dead centre.

The development of the sector 15 is smaller than that of the sector 13, so that the sector 15 can free itself from the sector 13 and stop, while the sector 13 continues to rotate.

The blade-reversing device which has just been described operates in the following manner (Figures 3 to 8).

In normal running, according to the type of operation and the direction of water flow, two zones of adjustment are used. The first corresponds to the blades in the normal position (Figure 3), and to an angular clearance of the crank 6 by a definite amount, for example 20°, on either side of its mean position, which corresponds in the case of Figure 3 to the crank 6 perpendicular to the axis of the hub 1. The second corresponds to reversed blades (Figure 8).

In the normal adjustment zones, the auxiliary control mechanism is completely freed from the normal adjustment mechanism which acts on its own, and adjustment occurs as in a conventional Kaplan turbine. The liquid pressure, acting either on one side or the other of the piston 11 of the servo motor 12, causes the blades to rotate in one direction or the other, as has already been described.

When reversal of the blades occurs auxiliary servo motor 18 comes into play.

If it is assumed that reversal occurs starting from the position illustrated in Figure 3, the control liquid first of all enters the chamber 34 above the piston 11 of the main servo motor 12.

The sector 13 then rotates in the direction of the arrow (Figure 3). The blades pass the end position of normal adjustment (for example 20°), and then, at a slightly gerater angle (for example 25°), the first tooth of the sector 13 comes into contact with the first tooth of the sector 15 (Figure 4).

Since the piston 11 continues to move in the same direction, the sector 13 causes the sector 15 to rotate and the auxiliary control mechanism is driven until the connecting-rod and crank system 14—17 reaches its dead centre position (Figure 5), and then slightly passes it.

The rod 10 of the piston 11, having reached the base of the hub 1, bears against the slide-valve 25 of the distributor, and liquid under pressure from the pipe 27 actuates the auxiliary servo motor 18. At this instant, the auxiliary mechanism assumes a driving function, and its action is added to that of the main servo motor 12. In addition, as the movement progresses, the driving force due to the main mechanism decreases until it disappears at its dead centre, while the force due to the auxiliary control mechanism continues to increase. The main mechanism could be put out of action for at least part of the time during which the auxiliary mechanism is operating. This is done, for example, by connecting the chamber 34 and the chamber 35 situated on either side of the piston 11.

When the piston 11 reaches the end of its stroke (Figure 6), the inlet of liquid to the servo motor 12 is reversed. The liquid under pressure then admitted to the chamber 35 sets up a driving force in the same direction as that produced by the auxiliary mechanism. The two driving forces are added.

The auxiliary mechanism operates up to the instant at which the rod 10 ceases to act on the distribution slide-valve 25.

From this instant, the normal mechanism again operates on its own, the piston 11 continues to rise, and the sector 13 meshes with the sector 15 up to the total development of the sector 15. The piston 19 of the auxiliary servo motor 18 is then in the end position (Figure 7). Only the last tooth of the sector 15 is in engagement with the sector 13. In order that the movement may continue, the last tooth of the sector 15 is so made as to be able to retract before the teeth of the sector 13 which must pass, and subsequently to resume a normal position allowing the two sectors to mesh for a reverse movement.

Figure 11 illustrates the end teeth 36 and 37 of the sector 15 which are pivoted about pins 38 and 39, and are pushed towards the teeth 13 by springs 40 and 41. Teeth 36 and 37 thus form pawls capable of moving away from the teeth when the teeth of the sector 13 pass in a definite direction.

When all the teeth of the sector 13 have passed over the tooth 37 acting as a pawl, the two mechanisms are freed from one another, the normal mechanism (servo motor 12) continues to move, and the blades reach the zone of normal operation (Figure 8).

The positions of the mechanisms illustrated in Figures 3 and 8 are strictly symmetrical. The device is completely reversible in operation.

In the preceding embodiment, teeth are provided in the form of pawls so that they can move away from the teeth on the sector 13. These teeth in the form of pawls may be replaced by ordinary teeth if the auxiliary control mechanism is slightly modified.

For example, a spring 42 could be provided between the piston 19 of the servo motor 18 and the end plate 43 forming an abutment at one end of the servo motor (Figure 12). This spring 42 would allow slight additional instantaneous movement of the sector 15, sufficient to allow the teeth to be freed from the sector 13. The spring 42 would then return the sector 15 to the meshing position, after the teeth on the sector 13 had passed.

In the embodiment illustrated in Figure 13, the hydraulically controlled servo motor 18 is replaced by a spring system 44. The spring 44 is compressed for a period corresponding to the movement illustrated in Figures 4 and 5, and expands after dead centre of the auxiliary control mechanism has been passed.

The spring system 44 operates as a return device in the same way as the servo motor 18.

The invention is not limited by the details of the embodiments of the reversing devices which have just been described, and which can be modified without departing from the scope of the invention.

What I claim is:

1. In a device for overcoming dead center the combination with a main connecting rod and crank system passing through a dead centre position and connected to a journal disengaged from said main connecting rod and crank system during the greater part of crank shaft rotation, an auxiliary control mechanism which drives the main connecting rod and crank system past its dead centre position only which comprises a first toothed sector secured to the journal, a second toothed sector having a smaller development and radius than those of said first toothed sector, having its axis parallel to that of the journal and capable of being meshed with said first toothed sector for a predetermined arc only at the dead center position of the main connecting rod and crank system, an auxiliary connecting rod and crank system said auxiliary crank being secured to said second sector, said auxiliary connecting rod and crank system having a dead centre position, and a return device coupled to said auxiliary connecting rod rotating said crank after the dead centre position of said auxiliary connecting rod and crank system has been passed.

2. A device as described in claim 1 in which said return device comprises a jack coupled to said auxiliary connecting rod, and means for actuating said jack and for rotating said crank after dead centre position of said auxiliary connecting rod and crank system has been passed.

3. A device as described in claim 2 in which said jack is hydraulically operated and said actuating means include a liquid distributor actuated by a servo motor.

4. A device as described in claim 1 in which said second toothed sector has a pawl tooth at each end of the sector.

5. A device as described in claim 1 in which said return device includes a spring which stores energy before the dead centre position of said auxiliary connecting rod and crank system is passed, and returns the stored energy after the dead centre position has been passed.

References Cited in the file of this patent

UNITED STATES PATENTS

| 219,295 | Mullins | Sept. 2, 1879 |
| 612,345 | Johnson | Oct. 11, 1898 |
| 678,767 | Roper | July 16, 1901 |
| 1,722,320 | Towers | July 30, 1929 |
| 1,753,485 | Towers | Apr. 8, 1930 |
| 2,160,012 | Botsford | May 30, 1939 |
| 2,679,964 | Farmwald | June 1, 1954 |

FOREIGN PATENTS

| 25,709 | Great Britain | 1904 |
| 750,951 | Great Britain | June 20, 1956 |